United States Patent [19]

Jones et al.

[11] 3,947,285

[45] Mar. 30, 1976

[54] ACCELERATOR

[75] Inventors: Kenneth Wood Jones, East Leake, near Loughborough; David John Hazeldine, West Bridgford, both of England

[73] Assignee: BPB Industries Limited, London, England

[22] Filed: Aug. 20, 1973

[21] Appl. No.: 389,763

[30] Foreign Application Priority Data

Nov. 7, 1972    United Kingdom............... 51368/72

[52] U.S. Cl. ................. 106/111; 106/109; 106/110
[51] Int. Cl.² .................... C04B 11/14; C04B 11/00
[58] Field of Search ............ 106/109, 111, 113, 110

[56] References Cited
UNITED STATES PATENTS

| | | | |
|---|---|---|---|
| 2,460,267 | 2/1949 | Haddon............................. | 106/111 |
| 2,494,403 | 1/1950 | Nies et al............................ | 106/109 |
| 3,198,858 | 8/1965 | Hansen et al....................... | 106/111 |

FOREIGN PATENTS OR APPLICATIONS 252,052    5/1963    Australia............................. 106/109

*Primary Examiner*—Patrick P. Garvin
*Assistant Examiner*—John P. Sheehan
*Attorney, Agent, or Firm*—Kenneth E. Roberts; Stanton T. Hadley; Samuel Kurlandsky

[57] ABSTRACT

The invention relates to an improved accelerator for gypsum board manufacture, the accelerator containing a ground mixture of gypsum and a long chain fatty carboxylic acid, e.g. stearic acid, or a salt thereof, to the manufacture of the accelerator, and to its use in gypsum board production. The accelerator is less liable to deterioration on storage than conventional gypsum accelerators, and its use yields gypsum board of improved properties.

9 Claims, No Drawings

ACCELERATOR

This invention relates to an accelerator for use in the manufacture of gypsum board.

In the conventional manufacture of gypsum board, an aqueous slurry of calcium sulphate hemihydrate, usually incorporating a foam component, is sandwiched between upper and lower paper sheets which are advanced so that the slurry on setting forms a paper surfaced strip or sheet which is subsequently cut to suitable lengths as boards. It is customary to incorporate in the slurry additives such as accelerators, bonding auxiliaries and wetting agents.

A commonly used accelerator is finely ground gypsum. Such an accelerator progressively loses its effectiveness on ageing in normal conditions; this renders inadvisable the long term storage of the prepared gypsum accelerator or its transportation over long distances, making it necessary to use this accelerator freshly prepared at the time of board manufacture.

We have now found that by grinding gypsum with long chain fatty carboxylic acids or with their salts, e.g. alkali metal, alkaline earth metal, ammonium, zinc and aluminium salts, an accelerator can be produced which at least over an initial period is less liable to deterioration on storage. The use of such an accelerator can also result in finished boards of improved quality, e.g. as regards the paper/core bond strength, and core hardness and compressive strength.

Accordingly, the present invention provides an accelerator for use in the manufacture of gypsum board comprising finely particulate intimate admixture of gypsum and a long chain fatty carboxylic acid or a salt thereof.

The invention also provides a method of manufacturing the accelerator by grinding gypsum and a long chain fatty carboxylic acid or salt thereof together to a fine powder.

The invention also provides a gypsum board in which the gypsum core contains a long chain fatty carboxylic acid or salt thereof.

The acid or salt may for example be present in the accelerator in an amount up to 10% by weight of the gypsum; in the production of gypsum board, the accelerator according to the invention can be used in approximately similar quantities as are generally necessary when using ground gypsum alone in the manufacture of gypsum board.

A preferred accelerator according to the present invention comprises an intimate admixture of gypsum (calcium sulphate dihydrate) and a long chain fatty carboxylic acid or an alkali or alkaline earth metal salt of a long chain fatty carboxylic acid ground together to provide a powder exhibiting a specific surface area of at least 800 m$^2$/kg, e.g. 800 to 1200 m$^2$/kg, when measured on a Rigden specific surface area apparatus.

Amongst the preferred acids and their salts for use in the present invention are stearic, palmitic, oleic and linoleic acids and their salts, e.g. of alkali metal or alkaline earth metals such as sodium, potassium, magnesium and calcium, or of ammonium, zinc or aluminium. Lower or higher saturated and unsaturated fatty acids or salts of these can be employed, but those of 12 carbon atoms or above, and most preferably those of at least 14 carbon atoms, are in general the most suitable.

An accelerator according to the invention obtained by milling gypsum with 2% of its weight of magnesium stearate to a specific surface area of 1000 m$^2$/kg (when measured by the Rigden method), gave satisfactory acceleration in the production of gypsum wallboard irrespective of age from 2 to 10 days from the date of preparation, and the resulting gypsum wallboard exhibited improved board quality. Sodium, potassium, ammonium, calcium, zinc and aluminium stearates have each been employed in the same manner instead of the magnesium stearate, with similarly improved results in each case.

The following examples of the present invention and the manner in which it may be performed are given solely by way of illustration, it being clearly understood that the invention is not limited to the examples herein described.

EXAMPLE 1

Freshly ground gypsum mineral accelerator and an accelerator according to the invention prepared by grinding gypsum with 2% by weight of magnesium stearate (both accelerators having a Rigden specific surface of 900 to 1000 m$^2$/kg) were exposed to normal atmospheric conditions for several days. At intervals during this period 0.3% by weight of each accelerator was added to plaster slurries of known setting time and the accelerated setting times measured. The following figures of accelerated slurry setting time were obtained, showing that the treated gypsum shows less change in its accelerating effect than does the untreated gypsum over a period of about 1 week.

| Accelerator | 0 | 1 | 6 | days |
|---|---|---|---|---|
| Untreated gypsum | 4 | 5½ | 5½ | minutes |
| Treated gypsum | 4½ | 4½ | 4¾ | minutes |

In a typical plasterboard (gypsum board) plant the time elapsing between the slurry emerging from the mixer and that at which it is sufficiently hard to be cut by the automatic cutter is usually of the order of only a few minutes, so that a drift of (say) 1 minute in the setting time can be of serious consequence.

EXAMPLES 2 TO 4

Freshly ground gypsum mineral accelerator and accelerators according to the invention prepared by grinding gypsum with 2% by weight of ammonium stearate, zinc stearate and aluminium stearate respectively (all accelerators having a Rigden specific surface area of 800 to 1000 m$^2$/kg) were exposed to normal atmospheric conditions for several days. At intervals during this period additions of accelerator were added to plasters of known setting time so as to maintain a reasonably constant accelerated setting time. The following data were obtained showing that the treated gypsum shows more stability in its accelerating effect than does ground gypsum over a period of about two weeks.

| Accelerator | 0 | 6 | 14 | days |
|---|---|---|---|---|
| Untreated gypsum: | | | | |
| Addition (%) | 0.3 | 0.5 | 0.8 | |
| Setting time (minutes) | 5 | 4¼ | 4½ | |
| Example 2 | | | | |
| Gypsum treated with ammonium stearate: | | | | |
| Addition (%) | 0.4 | 0.5 | 0.6 | |
| Setting time (minutes) | 4¼ | 4¼ | 3¾ | |

-continued

| Accelerator | 0 | 6 | 14 days |
|---|---|---|---|
| Example 3 | | | |
| Gypsum treated with zinc stearate: | | | |
| Addition (%) | 0.4 | 0.6 | 0.65 |
| Setting time (minutes) | 4¼ | 3¾ | 3½ |
| Example 4 | | | |
| Gypsum treated with aluminum stearate: | | | |
| Addition (%) | 0.4 | 0.55 | 0.65 |
| Setting time (minutes) | 4¼ | 4¼ | 4 |

The following examples have been obtained from production plant data:

EXAMPLE 5

Gypsum and magnesium stearate (98:2 weight ratio) were ground together in a rod mill. The specific surface area of the product was in the range 850 to 1150 m²/kg (Rigden). The accelerator was added at 0.5 to 0.6% (based on plaster feed weight) during plasterboard manufacture. This gave evidence of improved cleanliness of mixer, improved paper/core bond at similar core density and improved gypsum core compressive strength, in comparison with the results obtained by using a recrystallised gypsum accelerator in similar proportions.

EXAMPLE 6

Gypsum and magnesium stearate (98:2 weight ratio) were ground together in a ball mill to give a specific surface area of 900 m²/kg. The accelerator was stored in bags for three weeks prior to use in gypsum plasterboard manufacture. The accelerator was added at a rate of 0.7%, based on plaster weight. Even after three weeks ageing the accelerator was still satisfactory. Paper/core bond was improved significantly, and core hardness and core compressive strength were also improved, in comparison with the results obtained using a recrystallised gypsum accelerator in similar proportions.

EXAMPLE 7

Gypsum and magnesium stearate (98:2 weight ratio) were ground together in a ball mill to give a specific surface area of 850 to 960 m²/kg. The accelerator was added at an average rate of 0.21% (based on plaster feed weight) during plasterboard manufacture. Evidence is shown of improved core compressive strength, core hardness and grade of paper/core bond, in comparison with the results obtained using a recrystallised gypsum accelerator in similar proportions.

Details of the improved results obtained in Examples 5, 6 and 7 are summarised in the following Table. The grade of the paper/core bond specified in the Table was assessed by a test in which, after conditioning of the board, cross cuts are made with a sharp knife just deep enough to penetrate through the paper to the core. The cuts should be long enough to give a test length of 75 mm in the longitudinal dimension of the board. The point of the knife is inserted at the apex of each triangle and a small part of the paper is lifted. The point of paper is held between the blade of the knife and the thumb and one attempts to lift the paper vertically from the core. The distance in the longitudinal direction from the apex of the triangle to a point level with the limit of the bond or core failure is measured to the nearest mm and the result graded as follows:

| Grade 1 | 0 – 9 mm |
|---|---|
| Grade 2 | 10 – 19 mm |
| Grade 3 | 20 – 29 mm |
| Grade 4 | 30 – 39 mm |
| Grade 5 | greater than 39 mm |

| Property of Slurry/ Gypsum Board | Mean Value with a recrystallised gypsum accelerator | Example 5 Mean Value |
|---|---|---|
| Core density (kg/m³) | 910 | 899 |
| Core compressive strength (N/mm²) | 4.70 | 5.10 |
| Core hardness (N) | 102 | 104 |
| Grade of paper/core bond (the lower the number the better the bond) | 4.5 | 3.0 |

| Property of Slurry/ Gypsum Board | Mean Value with a recrystallised gypsum accelerator | Example 6 Mean Value |
|---|---|---|
| Core density (kg/m³) | 868 | 873 |
| Core compressive strength (N/mm²) | 4.04 | 4.59 |
| Core hardness (N) | 88 | 92 |
| Grade of paper/core bond | 5.0 | 4.0 |

| Property of Slurry/ Gypsum Board | Mean Value with a recrystallised gypsum accelerator | Example 7 Mean Value |
|---|---|---|
| Core density (kg/m³) | 1002 | 946 |
| Core compressive strength (N/mm²) | 8.67 | 9.02 |
| Core hardness (N) | 75 | 81 |
| Grade of paper/core bond | 3.0 | 2.5 |

EXAMPLE 8

Gypsum and magnesium stearate (98:2 weight ratio) were ground together in a tube mill to give a specific surface area averaging around 850 m²/kg. This accelerator was added at an average rate of 0.12% (based on plaster feed weight) during plasterboard manufacture, compared with 0.24% of potassium sulphate accelerator to give a similar plasterboard slurry setting time. The board according to the invention has a better paper/core bond and a better strength/density relationship at a significantly lower core density.

| Property of Slurry/ Gypsum Board | Mean Value with potassium sulphate accelerator | Example 8 Mean Value |
|---|---|---|
| Core density (kg/m³) | 1035 | 978 |
| Core compressive strength (N/mm²) | 8.12 | 7.40 |
| Core hardness (N) | 108 | 106 |
| Grade of paper/core bond | 4.2 | 3.4 |

We claim

1. A set accelerating agent for use in gypsum plaster comprising finely particulate intimate admixture of gypsum and up to 10% by weight, based on the weight of the gypsum, of a long chain fatty carboxylic acid or salt thereof containing from 12 to 22 carbon atoms.

2. An accelerator according to claim 1 wherein the acid or salt is selected from the group consisting of stearic, palmitic, oleic and linoleic acids and their salts.

3. An accelerator according to claim 1 wherein the accelerator has a specific surface area of at least 800 $m^2/kg$.

4. An accelerator according to claim 1 wherein the acid or salt comprises about 2% by weight of the admixture.

5. An accelerator according to claim 1 wherein the salt is selected from the group consisting of alkali metal, alkaline earth metal, ammonium, zinc and aluminum salts of the carboxylic acid.

6. An accelerator according to claim 1 wherein the carboxylic acid salt is a stearate.

7. A method of manufacturing an accelerator, for use in the manufacture of gypsum board from gypsum plaster, which comprises grinding gypsum and up to 10% by weight, based on the weight of the gypsum, of a long chain fatty carboxylic acid or a salt thereof containing from 12 to 22 carbon atoms together to a fine powder.

8. In a process for manufacturing a gypsum board from a plaster slurry, the improvement which comprises incorporating in the plaster slurry an accelerator comprising a finely particulate intimate admixture of gypsum and up to 10% by weight, based on the weight of the gypsum, of a long chain fatty carboxylic acid or a salt thereof containing from 12 to 22 carbon atoms.

9. A gypsum board core made by the process of forming a finely particulate intimate admixture of gypsum and up to 10% by weight, based on the weight of the gypsum, of a long chain fatty carboxylic acid or a salt thereof containing from 12 to 22 carbon atoms; incorporating the admixture in a plaster slurry; and setting the plaster slurry to the gypsum core.

* * * * *